3,213,105
BIS[(AZABICYCLOHEPTYL) THIOCARBONYL] SULFIDES
Wilhelm Franz Gruber, Wilmington, Del., assignor to E. I. du Pont de Nemours and Company, Wilmington, Del., a corporation of Delaware
No Drawing. Filed Aug. 7, 1963, Ser. No. 300,686
3 Claims. (Cl. 260—313)

This invention relates to novel sulfur-containing compounds, their preparation and their use as vulcanization accelerators.

While thiuram sulfides are a known class of accelerators for sulfur-curable elastomers, there is a surprising and unpredictable variation among different compounds of this general type, particularly with respect to the processing safety of stocks containing the accelerator and in the rate of cure and tensile properties obtained.

It has unexpectedly been found that the novel compounds of this invention having the formula

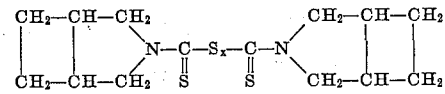

wherein $x$ is 1 or 2, when used as a vulcanization accelerator for sulfur-curable styrene-butadiene copolymer elastomers show significant advantages.

Bis[(azabicyclo[3.2.0]hept-3-yl)thiocarbonyl] disulfide, represented by the above structural formula when $x$ is 2, may be prepared by reacting 3-azabicyclo[3.2.0]-heptane with carbon disulfide in an aqueous alkaline medium, preferably at a temperature below 35° C. The salt of 3-azabicyclo[3.2.0]heptane-3-carbodithioic acid which forms may be oxidized without isolation to the corresponding disulfide. The preferred oxidizing agent is ammonium persulfate. Alternatively, hydrogen peroxide together with an acid such as sulfuric acid or acetic acid may be used as oxidizing agent. It is important to maintain the temperature during oxidation at about 10° C. The bis[(3-azabicyclo[3.2.0]hept-3-yl)thiocarbonyl]disulfide precipitates from the aqueous solution and may be isolated and recrystallized, if desired.

The monosulfide, represented by the above structural formula when $x$ is 1, may be formed from the disulfide by reaction with a sulfur-accepting reagent, preferably sodium cyanide. The reaction may be carried out in a solvent for the disulfide, such as ethyl alcohol, or the disulfide may be finely dispersed in water. The temperature is preferably between 50° and 100° C. When the disulfide is dissolved in a solvent it is convenient to carry out the reaction under reflux conditions. The product may be isolated and purified by conventional techniques. A method of preparing the starting material 3-azabicyclo[3.2.0]heptane is by the reduction of trans-1,2-dicyanocyclobutane to trans-1,2-bis(aminomethyl)cyclobutane and ring closure of this compound to form 3-azabicyclo[3.2.0]heptane. This method is illustrated in Example I.

Both the monosulfide and disulfide of this invention may be used as vulcanization accelerators for sulfur-curable elastomers; when the latter are butadiene-styrene copolymer elastomers, particularly advantageous results may be obtained. The monosulfide is particularly outstanding in safety afforded when it is used as the accelerator. Both compounds promote rapid cures to vulcanizates of excellent tensile properties.

The amounts of these compounds to be used as vulcanization accelerators in the vulcanization of butadiene-styrene copolymer elastomers range from about 0.2 part to about 1.5 parts by weight, per 100 parts of copolymer. Less than 0.2 part does not effect a satisfactory cure and more than 1.5 parts is not required and is not economical.

The disulfide of this invention is also useful as an intermediate for the monosulfide which, because of its safety, is the preferred vulcanization accelerator for butadiene-styrene copolymers.

The butadiene-styrene copolymer elastomers are prepared by the emulsion polymerization of butadiene and styrene as described in numerous references. See, for example, U.S. Patent 1,938,731 and M. Morton, "Introduction to Rubber Technology," Reinhold Publishing Corp., 1959, pages 256–284. The most commonly used butadiene-styrene copolymers contain 76.5 percent of butadiene and 23.5 percent of styrene, although other butadiene-styrene copolymers may contain up to 45 percent styrene.

The vulcanization procedures to be used in practicing the invention, except for the use of the new chemical compounds, are conventional. The vulcanizing agent is usually sulfur which is intimately admixed with the raw elastomer in amounts between about 0.5 and 15 parts, by weight, per 100 parts of polymer. The mixture to be vulcanized may also contain various other compounding ingredients, depending on the particular use that is to be made of the elastomer. Ingredients that may be used include the following: softeners such as refined, heavy coal-tar fractions, process oils, or petroleum asphalts; fillers such as carbon black or clay; activators such as metal oxides (usually zinc oxide), fatty acids, or rosin acids. The conventional antioxidants may be used. Coloring materials may be added if desired.

The compounding ingredients may be added to the solid polymer or to the latex by conventional techniques. Conventional methods of fabrication, molding, and curing may be used.

The vulcanization temperatures to be used are conventional and well known to those skilled in the art. They usually range from 140° to 200° C.

This invention will now be described with reference to the following examples of preferred embodiments thereof wherein parts and percentages are by weight unless otherwise specified.

EXAMPLE I (A) *Preparation of 3-azabicyclo[3.2.0]heptane*

40 parts by weight of trans-1,2-dicyanocyclobutane, 88 parts by weight of anhydrous ammonia, and 15 parts by weight of Raney nickel catalyst are charged into a stainless steel shaker vessel fitted with pressure- and temperature-sensing elements. The closed vessel, with contents, is heated for one hour at a temperature of 135–150° C., the corresponding pressure range being 450–600 atmospheres. The reactor is cooled to room temperature, vented, and the contents are washed out with methanol. The methanol solution is filtered to remove the metal catalyst, and the filtrate is distilled at atmospheric pressure to remove methanol, then at reduced pressure to recover about 26 parts by weight of trans-1,2-bis(aminomethyl)cyclobutane boiling at 40–60° C. at 2–4 mm. of mercury. Redistillation gives product boiling at 80–82° C. at 10 mm. Hg.

A mixture of 44 parts of trans-1,2-bis(aminomethyl)-cyclobutane, prepared as described above, 80 parts of methanol, and 10 parts of Raney nickel is agitated in a stainless steel autoclave and heated at 200° C. for two hours under autogenous pressure. The reaction mixture is cooled to room temperature, filtered to remove the catalyst, and distilled through a suitable fractionating column, collecting the material coming overhead at about 133° C. to 145° C. Redistillation gives 3-azabicyclo[3.2.0]heptane boiling at about 136° C. to 137° C. at the prevailing atmospheric pressure and having a refractive index, $n_D^{27}=1.4750$. The yield is about 33% of the theoretical value.

(B) *Preparation of bis[(3-azabicyclo[3.2.0]hept-3-yl)-thiocarbonyl]disulfide*

To a well-stirred mixture of 22 grams of 3-azabicyclo[3.2.0]heptane (0.227 mole) and 116 ml. of 2 N aqueous sodium hydroxide (0.232 mole) is added 17.7 grams (14 ml., 0.232 mole) of carbon disulfide from a dropping funnel. The temperature is kept below 35° C. by external cooling. Reaction takes place almost immediately and yields a clear orange solution containing the sodium salt of 3-azabicyclo[3.2.0]heptane - 3 - carbodithioic acid. This solution is cooled to 10° C. and 26 grams (0.114 mole) of ammonium persulfate in 100 ml. of distilled water is added dropwise. The product, bis[(3-azabicyclo[3.2.0]hept - 3 - yl)thiocarbonyl] disulfide, precipitates as amorphous flakes which crystallize after a few minutes. The product is collected on a Büchner funnel, washed with water, and dried. The yield is 38 grams (97.4% of theoretical based on the bicyclic imine) of a product having a melting point of 105–115° C. A sample for analysis and testing is recrystallized from ethyl alcohol. It has a melting point of 115–117° C. (uncorr.). This melting point is not altered by another recrystallization.

Analyses give the following results:

|  | Calc. for $C_{14}H_{20}N_2S_4$ | Found |
|---|---|---|
| C, Percent | 48.82 | 48.6 |
| H, Percent | 5.81 | 5.7–5.9 |
| N, Percent | 8.14 | 8.0–8.2 |
| S, Percent | 37.21 | 36.9–37.1 |

(C) *Preparation of the bis[(3-azabicyclo[3.2.0]hept-3-yl)thiocarbonyl] monosulfide*

A solution of 20 grams of bis[(3-azabicyclo[3.2.0]hept-3-yl)thiocarbonyl] disulfide in 1000 ml. of alcohol (Formula 2(B)) is brought to reflux. A solution of 4 grams of sodium cyanide in 100 ml. of 50% aqueous ethanol is added to the agitated solution during 5 minutes. Refluxing is continued for an additional 8 minutes, and the monosulfide is precipitated by the addition of 1000 ml. of distilled water. The crystalline precipitate of bis[(3-azabicyclo[3.2.0]hept - 3 - yl)thiocarbonyl] monosulfide is collected and dried. The yield is 15.3 grams, 84.4% of theoretical. The melting point of the crude product is 98–104°° C. After recrystallization from 80% ethanol the melting point is 111–113° C. (uncorr.).

Analyses give the following results:

|  | Calc. for $C_{14}H_{20}N_2S_3$ | Found |
|---|---|---|
| C, Percent | 53.86 | 53.8 |
| H, Percent | 6.41 | 6.5 |
| N, Percent | 8.98 | 8.7 |
| S, Percent | 30.75 | 30.8–30.9 |

EXAMPLE II

A compounded rubber stock is prepared using the following recipe:

| | Parts by weight |
|---|---|
| Butadiene-styrene copolymer | 100 |
| High abrasion furnace black | 52 |
| Process oil | 10 |
| N-phenyl-2-naphthylamine | 1 |
| Stearic acid | 1.5 |
| Zinc oxide | 5 |
| Sulfur | 2 |
| Accelerator (monosulfide of Ex. I, para. C) | As shown |

The butadiene-styrene used is SBR–1500 (previously known as GR–S–1500). It contains 23.5% bound styrene, has a Mooney viscosity (ML–4) of about 52, and a specific gravity of 0.94.

As a measure of processing safety Mooney scorch data are obtained at 138° C. according to ASTM Method D 1646–61 using the small rotor. Tensile properties are measured at 25° C. by ASTM Method D 412–61 T.

|  | (1) | (2) |
|---|---|---|
| Parts by weight of accelerator | 0.4 | 0.8 |
| Mooney Scorch: |  |  |
| Minimum | 23 | 23 |
| Minutes to 10-point rise | 27 | 27 |
| Tensile Properties: |  |  |
| Modulus at 300% elongation (p.s.i); Cure at 166° C., min.— |  |  |
| 5 | 1,000 | 1,700 |
| 10 | 1,475 | 1,950 |
| 20 | 1,550 | 2,200 |
| 30 | 1,575 | 2,200 |
| Tensile strength at break (p.s.i.); Cure at 166° C., min.— |  |  |
| 5 | 3,175 | 3,500 |
| 10 | 3,350 | 3,450 |
| 20 | 3,475 | 3,250 |
| 30 | 3,500 | 3,150 |
| Elongation at break, %; Cure at 166° C., min.— |  |  |
| 5 | 665 | 525 |
| 10 | 555 | 480 |
| 20 | 545 | 400 |
| 30 | 525 | 405 |

From the above data it can be seen that the use of the monosulfide accelerator of this invention yields elastomeric stocks whose quality and curing rate are excellent. In addition, the Mooney scorch test data shows the advantage in processing safety obtained using the novel accelerator; for example, if this example is repeated except that the acclerator used is a corresponding compound whose heterocyclic rings are monocyclic, the minutes to 10-point rise (Mooney scorch test) drops to only about 22–23 minutes, compared to the more favorable 27 minutes as shown above for this example.

EXAMPLE III

Example II is repeated except that the disulfide (prepared in Example I, para. B) is substituted for the monosulfide as the accelerator. Samples are tested as described in Example II. Results are as follows:

|  | (1) | (2) |
|---|---|---|
| Parts by weight of accelerator | 0.3 | 0.5 |
| Mooney Scorch: |  |  |
| Minimum | 24 | 25 |
| Minutes to 10-point rise | 17 | 13.5 |
| Tensile Properties: |  |  |
| Modulus at 300% elongation (p.s.i.); Cure at 166° C., min.— |  |  |
| 5 | 1,175 | 1,650 |
| 10 | 1,200 | 1,675 |
| 20 | 1,400 | 1,900 |
| 30 | 1,450 | 1,950 |
| Tensile strength at break (p.s.i.); Cure at 166° C., min.— |  |  |
| 5 | 3,100 | 3,250 |
| 10 | 3,200 | 3,125 |
| 20 | 3,550 | 3,200 |
| 30 | 3,675 | 3,525 |
| Elongation at break, Percent; Cure at 166° C., min.— |  |  |
| 5 | 615 | 500 |
| 10 | 620 | 480 |
| 20 | 630 | 450 |
| 30 | 640 | 480 |

From the above data it can be seen that the disulfide of this invention promotes rapid cures to vulcanizates having excellent tensile strength. In this respect it is surprisingly superior to a corresponding compound whose heterocyclic rings are monocyclic.

What is claimed is:
1. A compound of the formula

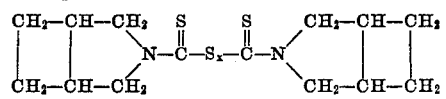

wherein $x$ is an integer from 1 to 2.

2. The compound

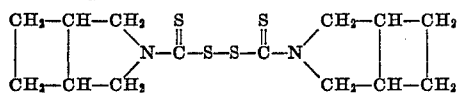

3. The compound

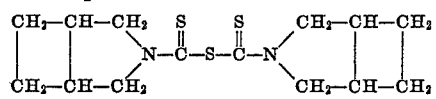

References Cited by the Examiner

UNITED STATES PATENTS

| | | | |
|---|---|---|---|
| 2,014,353 | 9/35 | Cramer | 167—22 |
| 2,187,719 | 6/38 | Williams | 260—239 |
| 2,784,223 | 3/57 | Scalera et al. | 167—22 |
| 2,842,554 | 7/58 | Sullivan | 260—313 |
| 2,847,419 | 8/58 | Harman et al. | 260—313 |
| 3,036,050 | 5/62 | D'Amico | 260—79.5 |
| 3,111,504 | 11/63 | Lober et al. | 260—79.5 |

OTHER REFERENCES

Frear: Chemistry of the Pesticides, third ed., D. Van Nostrand Company, Inc., New York, 1955, pages 299–300.

NICHOLAS S. RIZZO, *Primary Examiner.*